US009635569B2

(12) United States Patent
Park et al.

(10) Patent No.: US 9,635,569 B2
(45) Date of Patent: Apr. 25, 2017

(54) METHOD AND APPARATUS FOR MEASURING END-TO-END SERVICE LEVEL AGREEMENT IN SERVICE PROVIDER NETWORK

(71) Applicant: Samsung Electronics Co., Ltd., Suwon-si, Gyeonggi-do (KR)

(72) Inventors: Ki-Beom Park, Hwaseong-si (KR); Hyun-Woo Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 14/228,910

(22) Filed: Mar. 28, 2014

(65) Prior Publication Data
US 2014/0293799 A1  Oct. 2, 2014

(30) Foreign Application Priority Data
Mar. 28, 2013  (KR) .................. 10-2013-0033401

(51) Int. Cl.
| | | |
|---|---|---|
| *G01R 31/08* | (2006.01) | |
| *H04W 24/08* | (2009.01) | |
| *H04L 12/24* | (2006.01) | |
| *H04L 12/26* | (2006.01) | |

(52) U.S. Cl.
CPC ......... *H04W 24/08* (2013.01); *H04L 41/5009* (2013.01); *H04L 41/5038* (2013.01); *H04L 43/10* (2013.01); *H04L 41/0213* (2013.01); *H04L 41/06* (2013.01); *H04L 43/087* (2013.01); *H04L 43/0811* (2013.01); *H04L 43/0817* (2013.01); *H04L 43/0829* (2013.01); *H04L 43/0852* (2013.01); *H04L 43/0858* (2013.01); *H04L 43/0864* (2013.01); *H04L 43/0888* (2013.01); *H04L 43/106* (2013.01)

(58) Field of Classification Search
CPC ...................................... H04W 24/08
USPC .................... 370/241–339; 709/225–240
See application file for complete search history.

(56) References Cited

U.S. PATENT DOCUMENTS

| | | | | |
|---|---|---|---|---|
| 6,643,612 | B1 * | 11/2003 | Lahat ............... | G06F 1/14 |
| | | | | 702/182 |
| 2008/0031146 | A1 * | 2/2008 | Kwak ............... | H04L 41/5003 |
| | | | | 370/250 |

* cited by examiner

*Primary Examiner* — Iqbal Zaidi
(74) *Attorney, Agent, or Firm* — Jefferson IP Law, LLP

(57) ABSTRACT

An operation method and apparatus in a first end device of a service provider network is provided. The method includes generating a measurement frame including information supporting simultaneous measurement of a plurality of Service Level Agreement (SLA) metrics, sending the generated measurement frame to a second end device connected through the service provider network, receiving a reply frame corresponding to the generated measurement frame from the second end device, and analyzing the received reply frame and hierarchically acquiring the plurality of SLA metrics for the second end device.

18 Claims, 15 Drawing Sheets

| MEL | Version(1) | Opcode (DMM=47) | Reserved (0) | T | TLV Offset (32) |
|---|---|---|---|---|---|
| TxTimeStampf ||||||
| Reserved for DMM receiving equipment (0) (for RxTimeStampf) ||||||
| Reserved for DMR (0) (for TxTimeStampb) ||||||
| Reserved for DMR receiving equipment (0) ||||||
| Type(36) || Length(32) ||| Test ID |
| Test ID |||||  Type (3) |
| Length(32) ||| S(501) || Reserved |
| Sequence Number (502) ||||||
| Reserved for DMR (0) (Sender Sequence Number) (503) ||||||
| Data Pattern ||||||
|||||| End TLV (0) |

510

| MEL | Version(1) | Opcode (DMR=46) | Flags | TLV Offset (32) |
|---|---|---|---|---|
| TxTimeStampf |||||
| RxTimeStampf |||||
| TxTimeStampb |||||
| Reserved for DMR receiving equipment (0) (for RxTimeStampb) |||||
| Type(36) | Length(32) ||| Test ID |
| Test ID ||||  Type (3) |
| Length(32) || S(504) | Reserved ||
| Sequence Number (505) |||||
| Sender Sequence Number (506) |||||
| Data Pattern |||||
||||| End TLV (0) |

| Functional Block | Function | |
|---|---|---|
| Packet Sampling Method | Periodic Injection | |
| | Poisson stream injection | |
| Packet Interval Control | Packet Interval Configuration | |
| | Multiple Interval Support | |
| | Test Duration | |
| | Test Timeout Configuration | |
| | Test Repetition Configuration | |
| Frame Size | Frame Size Configuration | |
| | Payload Size Configuration | |
| | Random Frame Size | |
| | Payload Step Size Configuration | |
| Desired Bandwidth | PPS | |
| | BPS | |
| Flow Configuration | Usability options | |
| | MEG Level Configuration | ~1101 |
| | MEP Source Mac Address | ~1102 |
| | MEP Destination Mac Address | ~1103 |
| | MEP Mac Masks | ~1104 |
| | Source MEP ID | ~1105 |
| | Destination MEP ID | ~1106 |
| Protocol Type | RAW Socket Support | |
| Qos | CoS Marking | ~1107 |
| Session Control | Mutiple Session Control | |
| | Session Timeout Control | |
| SLA Management | LOSS | |
| | LOSS RATIO | |
| | THROUGHPUT | |
| | Automated RFC2544 Test | |
| | DELAY(min/max/avg) | |
| | DELAY(median/percentile/sd) | |
| | JITTER(min/max/avg) | |
| | JITTER(median/percentile/sd) | |
| | MOS | |
| | CONNECTIVITY | |
| | AVAILABILITY | |
| | Centralized PM provisioning | |
| | SLA Validation | |
| | SLA Reporting(Up/Down Separate) | |
| Analysis | Print Interval | |
| | File Input | |
| | File Report | |
| | CSV Export | |
| | PDF reports with configurable levels | |
| | Live real-time plots | |
| | On-demand snapshot reports | |
| | Web based reporting & end-user portals | |

FIG.11

| CATEGORY | Function |
|---|---|
| COUNT | Packets (Tx/Rx) (Delta) |
| | Bytes (Tx/Rx) (Delta) |
| | Packets (Tx/Rx) (Sum) |
| | Bytes (Tx/Rx) (Sum) |
| BANDWIDTH | Throughput bps (Tx/Rx) (Delta) |
| | Throughput pps (Tx/Rx) (Delta) |
| | Throughput bps (Tx/Rx) (Sum) |
| | Throughput pps (Tx/Rx) (Sum) |
| ERROR | Internal Loss (Delta) : Timeout drop |
| | Internal Loss (Sum) : Timeout drop |
| | Network Loss (Delta) |
| | Network Loss (Sum) |
| | Uplink Loss |
| | Downlink Loss |
| | Loss bursts |
| | Loss Ratio (Delta) |
| | Loss Ratio (Sum) |
| | Longest loss burst |
| | Shortest loss burst |
| | Reordering |
| | Reordering Ratio |
| | Duplicate |
| | Duplicate Ratio |
| SLA | Delay (Two-way) (Delta) |
| | Delay (Two-way) (Sum) |
| | Delay (One-way) (Sum) : Need Time sync |
| | Jitter (Two-way, RTP based) (Delta) |
| | Jitter (Two-way, RTP based) (Sum) |
| | Jitter (One-way, RTP based) (Sum) |
| | Voice Quality (MOS) (Delta) |
| | Voice Quality (R-Factor) (Delta) |
| | Voice Quality (MOS) (Sum) |
| | Voice Quality (R-Factor) (Sum) |
| | Availability (Sum) |
| | Connectivity (Sum) |
| ALARM | LOSS |
| | LOSS RATIO |
| | THROUGHPUT |
| | DELAY |
| | JITTER |
| | MOS |
| | CONNECTIVITY |
| | AVAILABILITY |

FIG.12

MultiSession Test : Yes
ALL MEL Test : Yes

| MEG ID | MEP ID | MAC_ADDR | COS | SIZE | DURATION | TEST | LOSS | DELAY | JITTER | THROUGHPUT | MOS | CONNECTIVITY | AVAILABILITY | ALARM |
|---|---|---|---|---|---|---|---|---|---|---|---|---|---|---|
| 7 | 2 | 12:34:56:78:9A:BC | 0 | 64 | 10 | [300/10000] | 1 | 0.134 | 0.001 | 950.999bps | 1.501 | 100.00% | 95.00% | LO |
| 6 | 3 | 12:34:56:78:9A:BD | 1 | 128 | 20 | [250/1000] | 0 | 0.254 | 0.002 | 450.999bps | 1.442 | 100.00% | 85.00% | CO |
| 5 | 4 | 12:34:56:78:9A:BE | 2 | 256 | 40 | [110/500] | 0 | 0.172 | 0.004 | 999.999bps | 1.241 | 99.95% | 88.35% | JM |
| 4 | 5 | 12:34:56:78:9A:BF | 3 | 512 | 80 | [50/5000] | 1 | 0.221 | 0.001 | 100.0bps | 1.553 | 99.10% | 91.19% | MO |
| 4 | 6 | 12:34:56:78:9A:BG | 4 | 1500 | 100 | [1000/1000] | 1 | 0.189 | 0.001 | 10.0bps | 1.456 | 99.00% | 92.45% | - |

FIG.13

METHOD AND APPARATUS FOR MEASURING END-TO-END SERVICE LEVEL AGREEMENT IN SERVICE PROVIDER NETWORK

CROSS-REFERENCE TO RELATED APPLICATION(S)

This application claims the benefit under 35 U.S.C. §119(a) of a Korean patent application filed on Mar. 28, 2013 in the Korean Intellectual Property Office and assigned Serial number 10-2013-0033401, the entire disclosure of which is hereby incorporated by reference.

TECHNICAL FIELD

The present disclosure relates to a service provider network. More particularly, the present disclosure relates to a method and apparatus for measuring and managing an end-to-end Service Level Agreement (SLA).

BACKGROUND

Currently, as a mobile communication service has been developed into a 4 Generation (G) from conventional 2G and 3G, a network which provides the mobile communication service has been developed into a form in which various mobile communication network equipment and wired communication equipment, such as, a switch including a backhaul and backbone network, etc., a router, etc. are complexly configured. As there have been various small cells in addition to conventional macro equipment in a next generation of a wireless service provider network environment, to measure and manage a quality of a great number of network equipment effectively has been a domain for a core technology in providers who operate their networks.

There is a Y.1731 Performance Monitoring (PM) method of an Ethernet Operation, Administration and Maintenance (OAM) method as a network quality measurement technology which is most widely used by conventional mobile communication providers. The Y.1731 PM method is a standard issued by International Telecommunication Union-Telecommunication standardization (ITU-T) and is a communication quality measurement standard adopted as the standard in Metro Ethernet Forum (MEF). Because the Y.1731 PM method is the standard issued by ITU-T and differs from a Two-Way Active Measurement Protocol (TWAMP), which is standard made by Internet Engineering Task Force (IETF) which is an Internet standard group, it is a performance monitoring method currently recommended by many communication providers around the world as well as in Europe.

Measurement frames are separated and designed while being classified according to metrics to obtain a network quality parameter in this Y.1731 PM method. That is, because a corresponding fragmentary metric is acquired through respective measurement frames, there is a limit not to provide various metrics through one frame. Therefore, because traffics of several frames must be provided to satisfy a complex test condition and simultaneously obtain various metrics, an increase in this entire traffic results in an increase in network load. Also, because respective frames provided to measure various SLR parameters have an influence on a Service Level Agreement (SLA) measurement result, it is not easy to calculate an accurate SLA parameter and an overlapped metric is provided between frames.

Accordingly, there is a need to provide an improved technology for measuring network quality in a service provider network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for measuring and managing an end-to-end Service Level Agreement (SLA) using improved Y1731 Performance Monitoring (PM) in a service provider network which provides a Layer 2 (L2)-based mobile communication service.

Accordingly, another aspect of the present disclosure is to provide a method and apparatus for expanding a message of a Y1731 PM frame for conventional Ethernet Operation, Administration and Maintenance (OAM) and simultaneously acquiring various metrics using one frame.

Accordingly, another aspect of the present disclosure is to provide a method and apparatus for measuring a complex test condition of an L2 packet generator level and various SLA metrics using one expanded frame.

Accordingly, another aspect of the present disclosure is to provide a method and apparatus for reducing a real amount of traffics by satisfying a complex test condition and acquiring various metrics using one frame.

Accordingly, another aspect of the present disclosure is to provide a method and apparatus for helping a user to more accurately predict network quality and further improve network quality by measuring a more accurately and simply SLA parameter in an integrated environment using one expanded frame.

In accordance with an aspect of the present disclosure, an operation method in a first end device of a service provider network is provided. The operation method includes generating a measurement frame including information supporting simultaneous measurement of a plurality of Service Level Agreement (SLA) metrics, sending the generated measurement frame to a second end device connected through the service provider network, receiving a reply frame corresponding to the generated measurement frame from the second end device, and analyzing the received reply frame and hierarchically acquiring the plurality of SLA metrics for the second end device.

In accordance with another aspect of the present disclosure, a first end device of a service provider network is provided. The first end device includes a frame generator configured to generate a measurement frame including information supporting simultaneous measurement of a plurality of Service Level Agreement (SLA) metrics, a sender configured to send the generated measurement frame to a second end device connected through the service provider network, a receiver receiving a reply frame corresponding to the generated measurement frame from the second end device, and an SLA analyzer for analyzing the received reply frame and hierarchically acquiring the plurality of SLA metrics for the second end device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates an improved Y.1731 PM frame structure according to an embodiment of the present disclosure;

FIG. 11 illustrates a test condition for an SLA measurement operation according to an embodiment of the present disclosure;

FIG. 12 illustrates metrics for an SLA measurement operation according to an embodiment of the present disclosure;

FIG. 13 illustrates an analysis result according to SLA measurement according to an embodiment of the present disclosure

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 14:
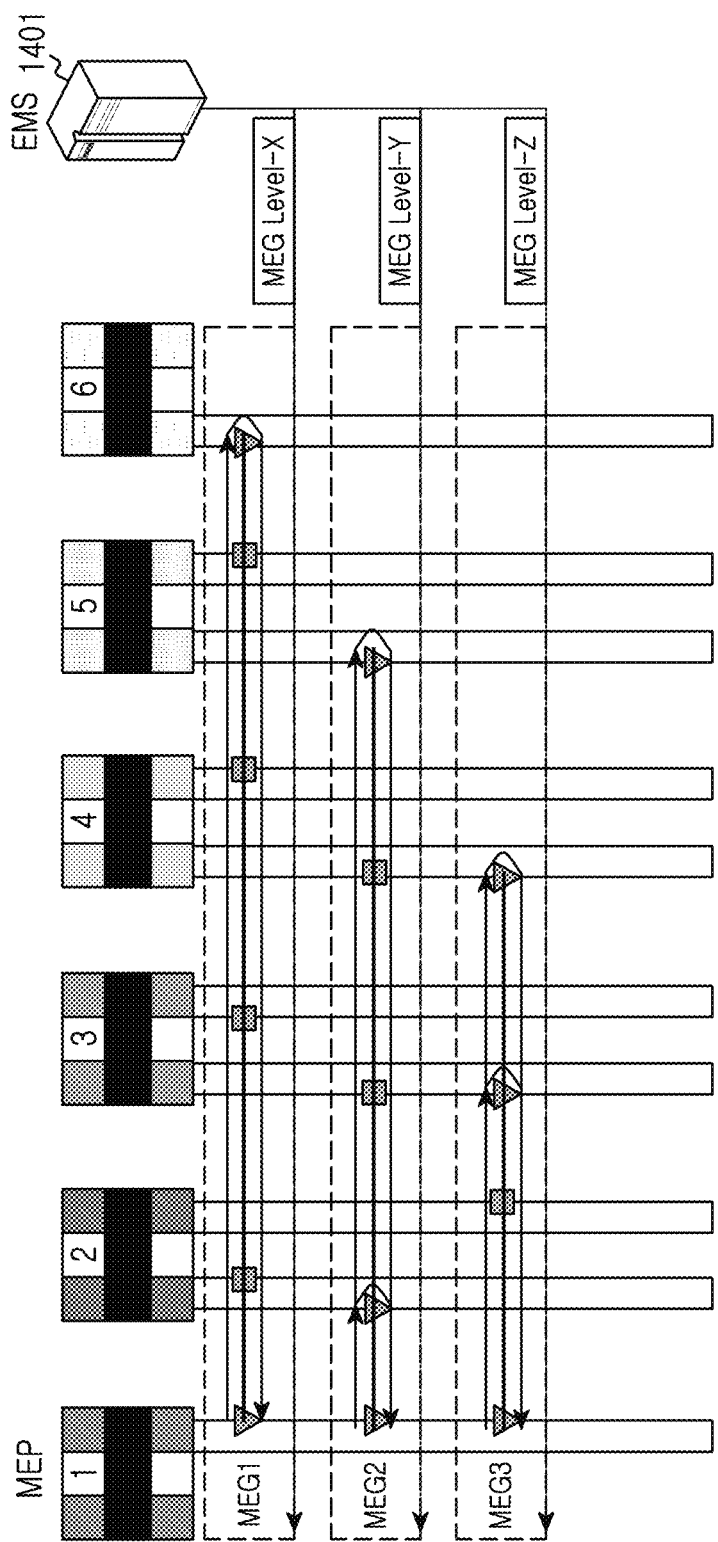
FIG. 14 illustrates execution of an SLA measurement operation for a multi-session according to another embodiment of the present disclosure.
Figure 15:
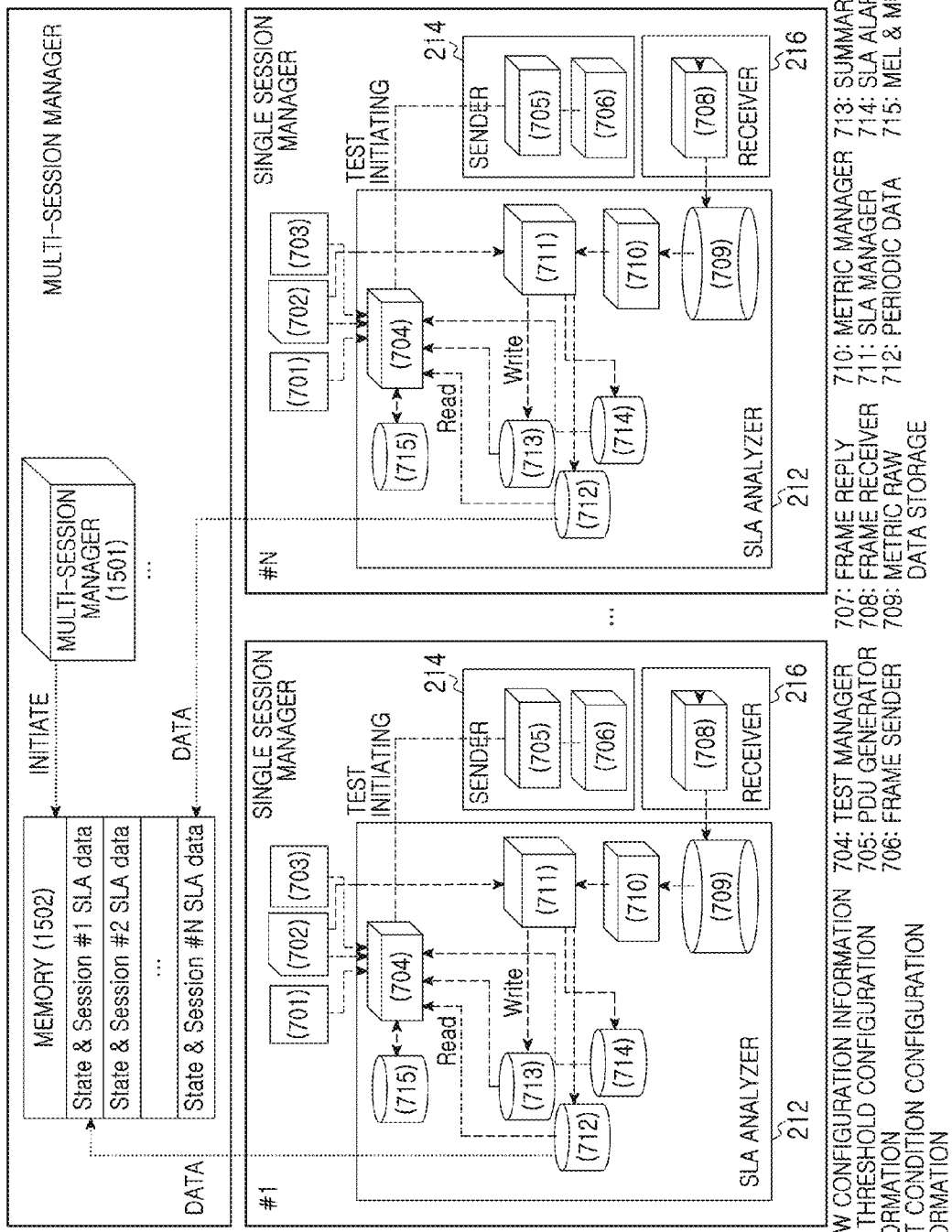
FIG. 15 is a block diagram illustrating an apparatus for an SLA measurement operation for a multi-session according to another embodiment of the present disclosure.

Various embodiments of the present disclosure, which will be described below, are related to a method of generating as many results as possible within a short time while minimizing a load of a network in case of using a Y.1731 Performance Monitoring (PM) method, which is an Ethernet Operation, Administration and Maintenance (OAM) method, which is most commonly used by conventional mobile communication providers. A method provided in the present disclosure is a new method of verifying a state and quality of a network based on Ethernet. An end-to-end Service Level Agreement (SLA) may be managed by an improved method through this method. Hereinafter, a description will be given for a Y.1731 PM method to which various embodiments of the present disclosure are applied. Thereafter, a description will be given for an SLA measurement method according to one embodiment of the present disclosure. The SLA measurement method according to one embodiment of the present disclosure will be mainly describe as an example of being performed for a single session. However, as illustrated in FIGS. 14 and 15, the SLA measurement method according to one embodiment of the present disclosure may be performed for a multi-session.

Figure 1:
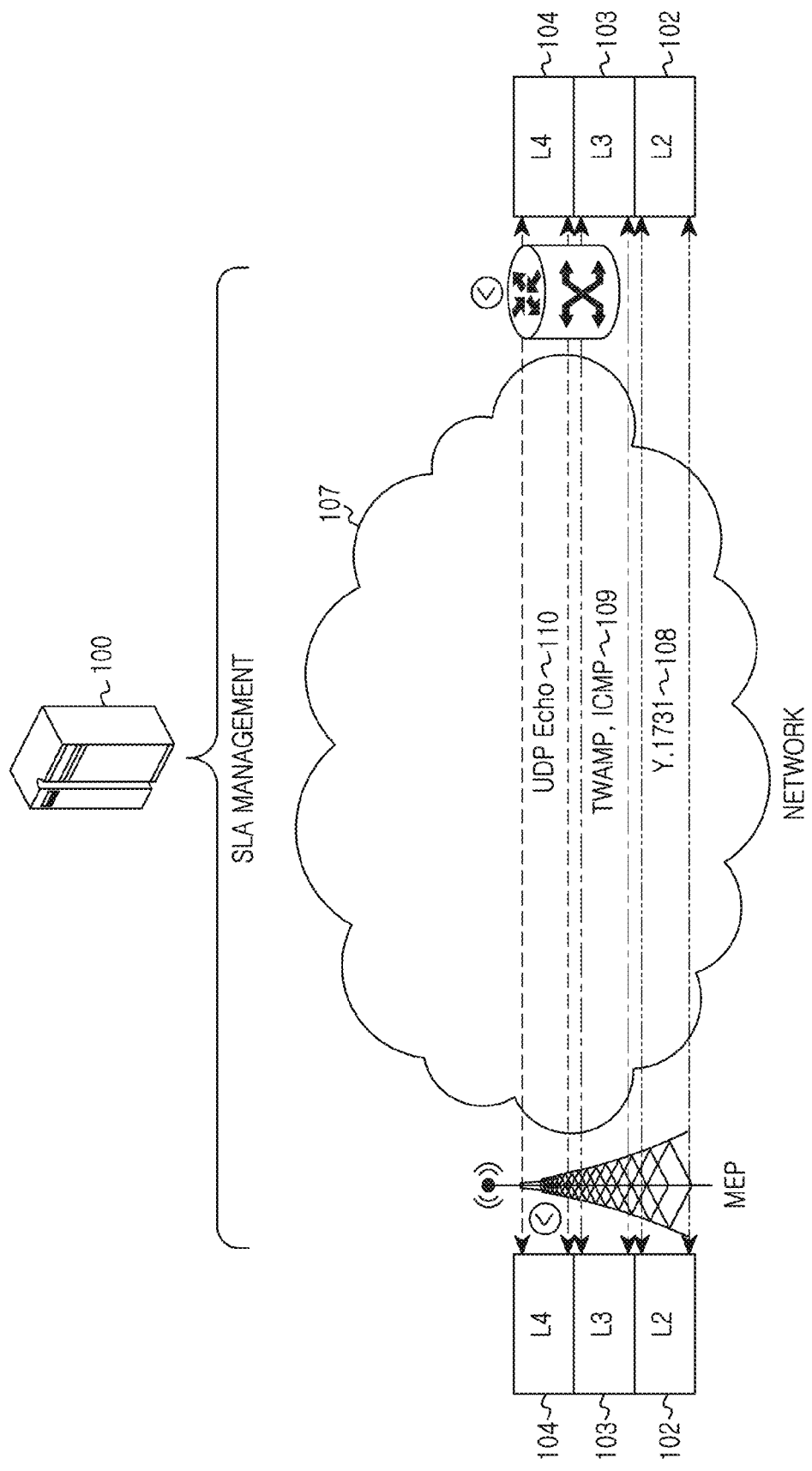
FIG. 1 illustrates various Service Level Agreement (SLA) measurement methods using an active monitoring scheme.

FIG. 1 illustrates various SLA measurement methods using an active monitoring scheme.

Referring to FIG. 1, an SLA Element Management System (EMS) 100 may perform an operation for measuring and managing an end-to-end SLA of a network 107. A Y.1731 PM method 108 transmits a measurement packet basically based on an Ethernet frame which is a Layer 2 (L2) 102 packet and analyzes a network quality state using the measurement packet. There is a measurement method using a protocol such as an Internet Control Message Protocol (ICMP) or a Two-Way Active Measurement Protocol (TWAMP) 109, which transmits a measurement packet in an Internet Protocol (IP) Layer 3 (L3) 103 or a measurement method using a User Datagram Protocol (UDP) echo 110, etc. in a transport Layer 4 (L4) 104 to differ from the Y.1731 PM method 108. However, these measurement methods do not support Ethernet-based measurement because they use a protocol of an upper layer.

That is, because the Y.1731 PM method 108 supports an Ethernet-based measurement method of the lowest layer, the Y.1731 PM method 108 may perform measurement irrespective of a protocol of an upper layer. If there is an interval using only information about the L2 102 including Ethernet in a measured interval, there is an advantage in that a measurement method driven in another upper layer may be not used and only a measurement method using Y.1731 PM 108 may be used.

Figure 2:
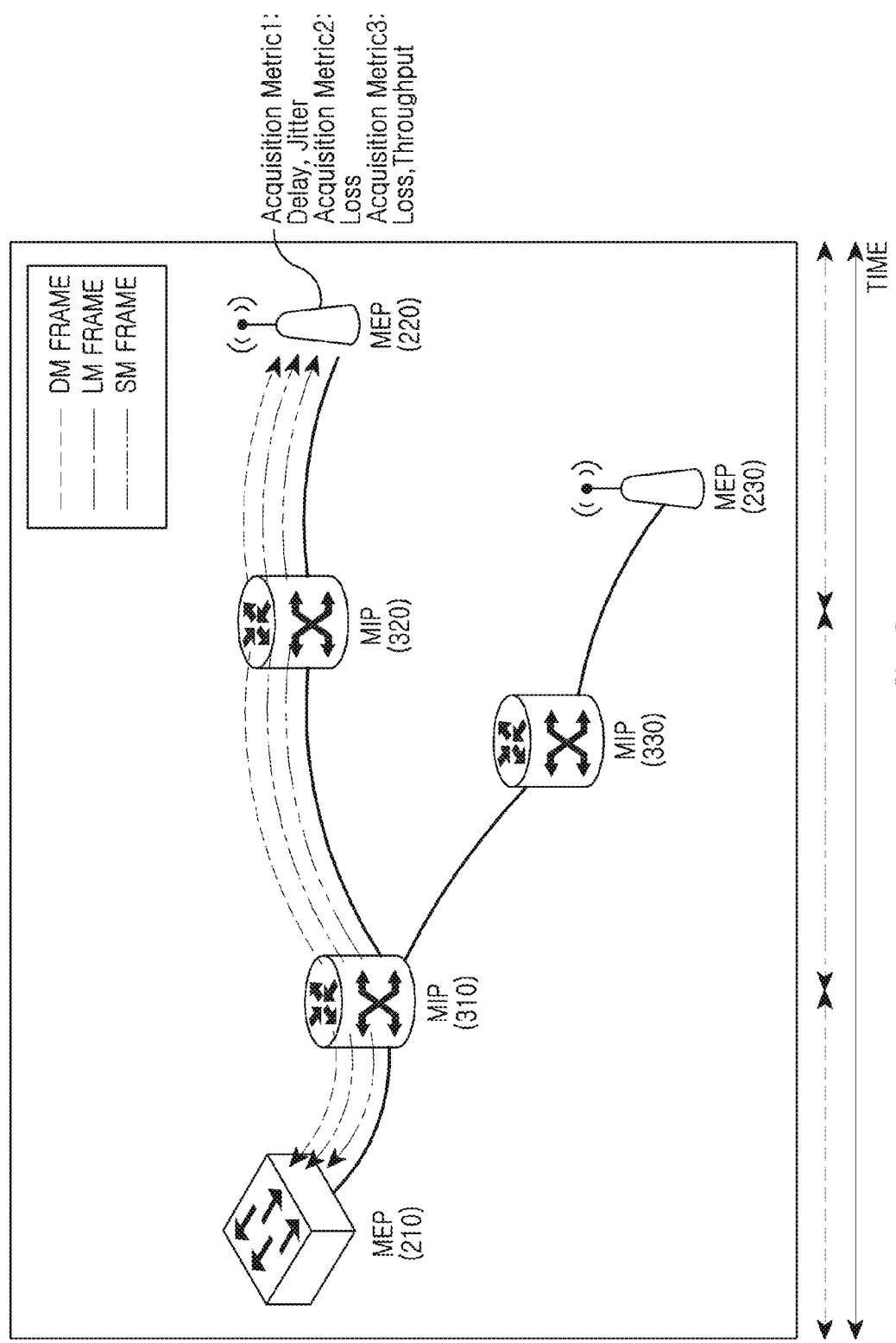
FIG. 2 illustrates an SLA measurement method using a Y.1731 standard frame.

FIG. 2 illustrates an SLA measurement method using a Y.1731 standard frame.

Referring to FIG. 2, a system for SLA measurement includes Maintenance End Points (MEPs) 210, 220, and 230 which are both end devices and Maintenance Intermediate Points (MIPs) 310, 320, and 330 which are intermediate devices. The system may measure quality of a network a user feels actually by measuring quality of an end-to-end traffic (that is, a traffic between the MEPs 210 and 220 or between the MEPs 210 and 230).

In a Y.1731 PM standard, various frames are used to acquire various quality parameters indicating quality of a network. For example, an ETHernet-frame Delay Measurement (ETH-DM) frame is used to measure a delay and jitter of a frame. An ETHernet-frame Loss Measurement (ETH-LM) frame is used to use measure a loss of a frame. A Synthetic Loss Measurement (SLM) frame is used to measure a synthetic loss and throughput.

Figure 3:
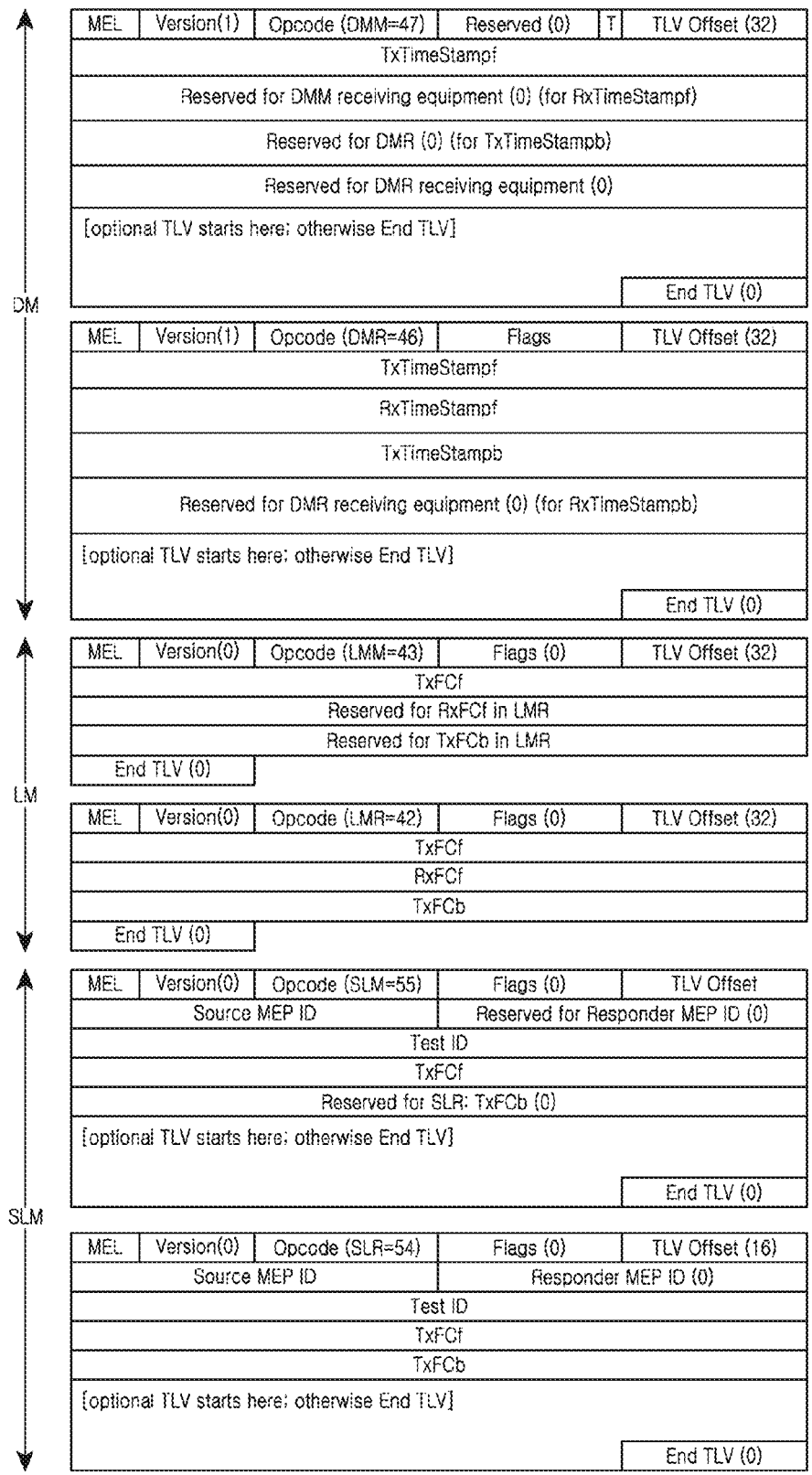
FIG. 3 illustrates a structure of a Y.1731 Performance Monitoring (PM) standard frame.

FIG. 3 illustrates a structure of a Y.1731 PM standard frame.

Referring to FIG. 3, a DM frame is the above-described ETH-DM frame. The DM frame is classified into a Delay Measurement Message (DMM) transmitted from a transmission-side MEP (initiating MEP or source MEP) to a reception-side MEP (target MEP or destination MEP) and a Delay Measurement Reply (DMR) transmitted from the reception-side MEP to the transmission-side MEP in response to the DMM. In order to a delay and jitter, the DM frame includes a TxTimeStampf field, a RxTimeStampf field, a TxTimeStampb field, and an RxTimeStampb field. An LM frame is the above-described ETH-LM frame. The LM frame is classified into a Loss Measurement Message (LMM) transmitted from the transmission-side MEP to the reception-side MEP and a Loss Measurement Relay (LMR) transmitted from the reception-side MEP to the transmission-side MEP in response to the LMM. In order to measure a loss, the LM frame includes a TxFCf field, an RxFCf field, and a TxFCb field. An SLM frame is classified into a Synthetic Loss Message (SLM) transmitted from the transmission-side MEP to the reception-side MEP and a Synthetic Loss Replay (SLR) transmitted from the reception-side MEP to the transmission-side MEP in response to the SLM. In order to measure a frame loss and throughput, the SLM frame includes a test ID field, a TxFCf field, and a TxFCb field.

As described above, the Y.1731 PM standard defines and measures different frame formats while being classified according to respective quality parameters. Each of frames is classified by an Opcode which is a frame type field.

An embodiment of the present disclosure, which will be described below, relates to a framework which measures an end-to-end SLA in a network configured as an L2 network. A Y.1731 PM protocol, described above, defined as a standard in International Telecommunication Union-Telecommunication (ITU-T), is improved and used as a base protocol for measuring the end-to-end SLA. A method of measuring an SLA based on the improved Y.1731 PM protocol may test a network using an integrated frame by a complex test condition. These various embodiments of the present disclosure have a complex function including a framework for applying the Y.1731 PM protocol and easily measuring an SLA in a service provider network like an Ethernet network.

An embodiment of the present disclosure, which will be described below, may be classified into the following processes.

A process of setting a flow and a test condition to perform an L2 SLA test;

A process of acquiring and analyzing L2 SLA metrics;

An internal operation process of measuring the entire SLA metric and analyzing the measured result;

A process of analyzing an SLA acquired based on a set SLA parameter; and

A multi-session management process of managing several sessions.

Figure 4:
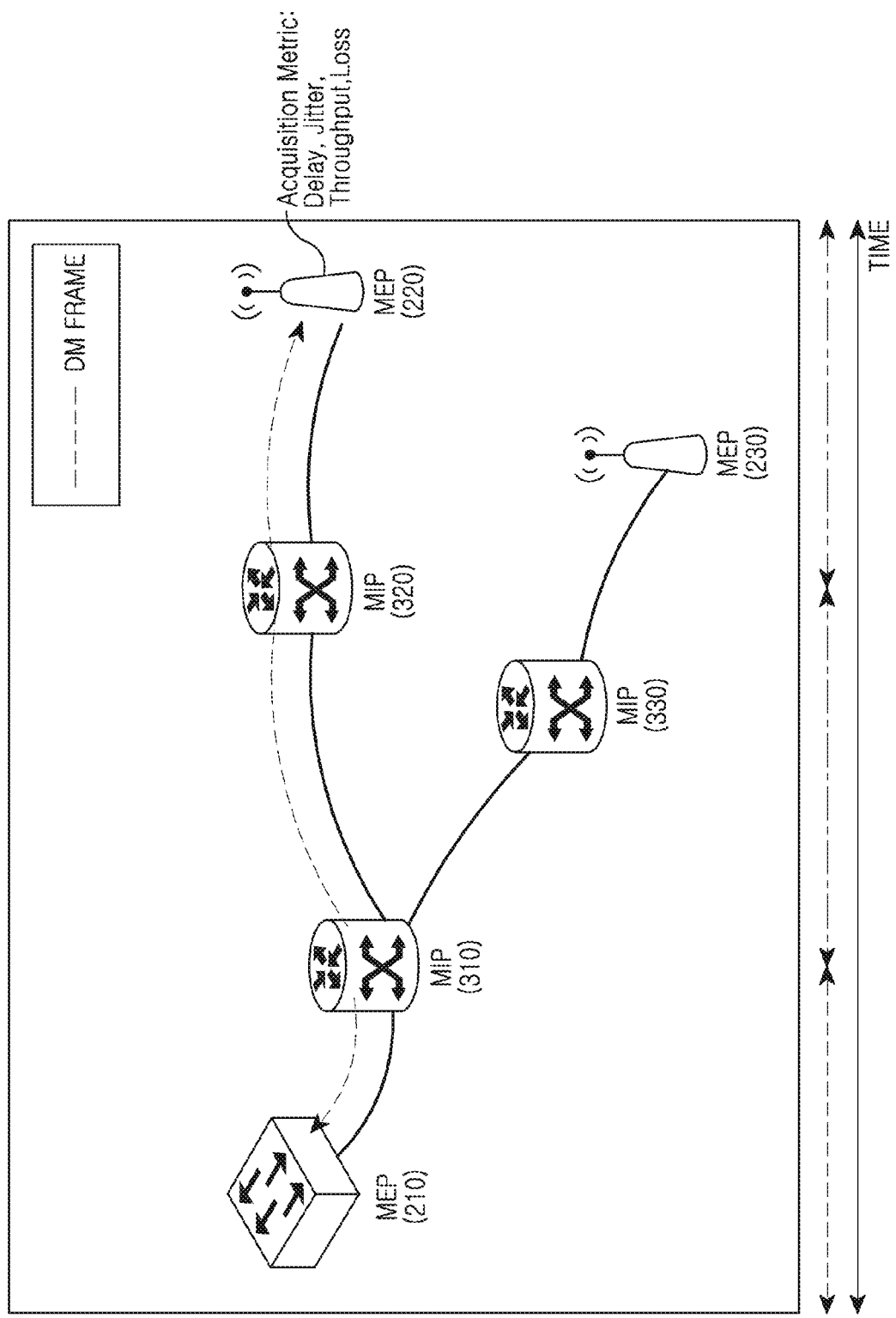
FIG. 4 illustrates an improved SLA measurement method according to an embodiment of the present disclosure.

FIG. 4 illustrates an improved SLA measurement method according to an embodiment of the present disclosure.

Referring to FIG. 4, a system for SLA measurement includes MEPs 210, 220, and 230 which are both end devices and MIPs 310, 320, and 330 which are intermediate devices.

A single frame is used to measure an end-to-end SLA for example, an SLA between the MEPs 210 and 220 or between the MEPs 210 and 230. Thus, a single frame (i.e., a DM frame) is used to monitor performance between the MEP 210 and the MEP 220. Therefore, metrics of a delay, a jitter, a throughput, and a loss are acquired.

FIG. 5 illustrates an improved Y.1731 PM frame structure according to an embodiment of the present disclosure.

Referring to FIG. 5, a structure 510 for a DMM transmitted from a transmission-side (initiating or source) MEP 210 to a reception-side (target or destination) MEP 220 is illustrated. A structure 520 is a structure for a DMR, transmitted from the reception-side MEP 220 to the transmission-side MEP 210, as a reply to the DMM. Frames of these structures have an integrated Protocol Data Unit (PDU) structure which may acquire a metric for measuring a plurality SLAs through one frame. A PM frame according to one embodiment of the present disclosure includes a TxTimeStampf field, an RxTimeStampf field, a TxTimeStampb field, and an RxTimeStampb field. These fields are fields for acquiring metrics, for measuring a delay and jitter, as an SLA. Also, the PM frame according to one embodiment of the present disclosure includes a type (32 bits) field, a length (32 bits) field, a test ID field, a type (3 bits) field, a length (32 bits) field, S fields 501 and 504, sequence number fields 502 and 505, sender sequence number fields 503 and 506, and a data pattern field.

The S fields 501 and 504 are synchronization state information necessary for a peer MEP (that is, the reception-side MEP 220) and a one-way measurement method. The sequence number fields 502 and 505 are information transmitted by the transmission-side MEP 210 or the reception-side MEP 220 to acquire metrics such as loss, reordering, duplicate, availability, and connectivity. The sender sequence number fields 503 and 506 are sequence number information transmitted by a peer MEP (that is, the reception-side MEP 220) and are information used in measuring loss of an uplink/downlink.

Figure 6:
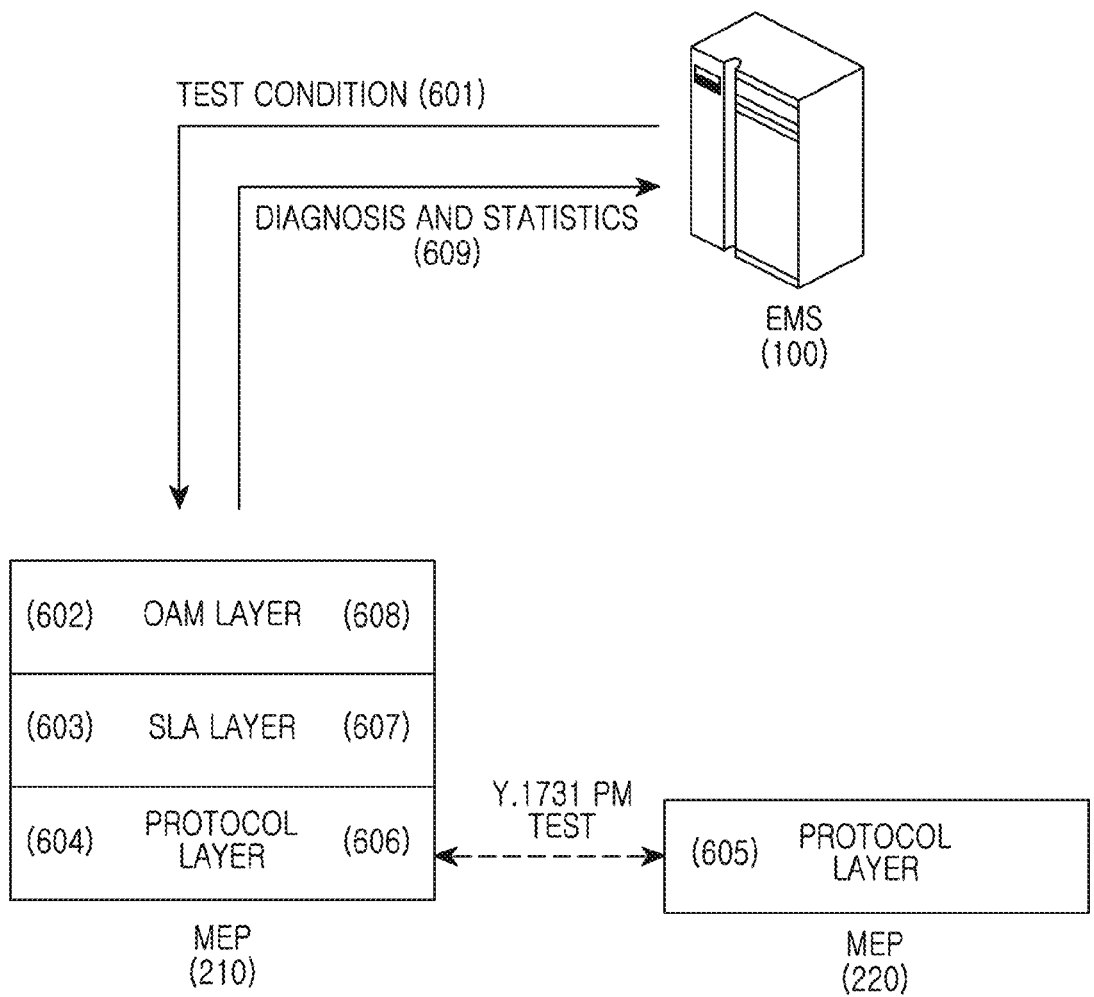
FIG. 6 illustrates a framework layered structure for an SLA measurement operation according to an embodiment of the present disclosure.

FIG. 6 illustrates a framework layered structure for an SLA measurement operation according to an embodiment of the present disclosure.

Referring to FIG. 6, a managed equipment of a corresponding service provider is managed by an EMS 100 which is a management system. Therefore, in order to manage network quality effectively, test conditions such as flow configuration and test condition configuration are set through the EMS 100. A result measured using a Y.1731 PM protocol according to one embodiment of the present disclosure is transmitted to the EMS 100 and is managed by the EMS 100. For example, the MEPs 210 and 220 may be base stations and the EMS 100 may be a base station manager.

A basic operation procedure according to one embodiment of the present disclosure is as follows:

(1) The EMS 100 transmits an SLA test condition 601 to a protocol layer 604 through an OAM layer 602 and an SLA layer 603 of the MEP 210.

(2) The protocol layer 604 encodes Y.1731 protocol related information based on the received test condition and starts transmission of a Y.1731 protocol. That is, the protocol layer 604 starts a test operation for measuring an SLA. A protocol layer 605 of the peer MEP 220 interworks with the protocol layer 604 of the transmission-side MEP 210 and performs an operation for measuring an SLA.

(3) A protocol layer 606 receives a frame received as a bidirectional measurement result from the protocol layer 605 of the Y.1731 peer MEP 220.

(4) An SLA layer 607 of an L2 analyzes the frame received in the protocol layer 606, generates various network quality related metrics, and manages the generated network quality related metrics.

(5) An OAM layer 608 performs an OAM function such as a function for diagnosing the metrics generated and managed in the SLA layer 607 and compiling the metrics, etc.

(6) The OAM layer 608 interworks with a diagnosis and statistics related OAM interface and transmits SLA related diagnosis and statistics information 609 to the EMS 100.

In accordance with one embodiment of the present disclosure, in order to measure an end-to-end SLA in a service provider network, the MEP 210 which is a first end device performs generating a measurement frame including information supporting simultaneous measurement of a plurality of SLA metrics, sending the generated measurement frame to a second end device connected through the network, receiving a reply frame corresponding to the generated measurement frame from the second end device, and analyzing the received reply frame and hierarchically acquiring the plurality of SLA metrics for the second end device.

The plurality of SLA metrics may include a delay, a jitter, a loss, and a throughput. The measurement frame or the reply frame may include a first field including information for measuring a delay and a second field including information for measuring at least one of loss, reordering, duplicate, availability, and connectivity. The measurement frame or the reply frame may further include a third field including frame type information for measuring a packet transmission and reception result. Also, the measurement frame or the reply frame may further include a fourth field including synchronization state information with the second end device.

The analysis of the received reply frame and the hierarchical acquisition of the plurality of SLA metrics may include a primary analysis process of analyzing the first field and acquiring a delay metric, analyzing the third field and acquiring metrics of a count, a bandwidth, and a loss, and analyzing the second field and acquiring at least one metric of reordering, duplicate, availability, and connectivity, a secondary analysis process of acquiring a jitter metric using the delay metric, and a tertiary analysis process of acquiring a voice quality metric using the jitter metric.

Information about the acquired SLA metrics may be transmitted to an upper management system. The information about the acquired SLA metrics may include diagnosis information as a result of comparing the acquired SLA metrics with predetermined metric threshold values.

The generation of the measurement frame including the information supporting the simultaneous measurement of the plurality of SLA metrics may include generating the measurement frame based on a test condition provided from the upper management system.

Sending the generated measurement frame to at least one third end device except for the second end device connected through the network when a multi-session operation according to one embodiment of the present disclosure is performed, receiving a reply frame corresponding to the generated measurement frame from the third end device, and analyzing the received reply frame and hierarchically acquiring the plurality of SLA metrics for the third end device may be further performed.

Figure 7:
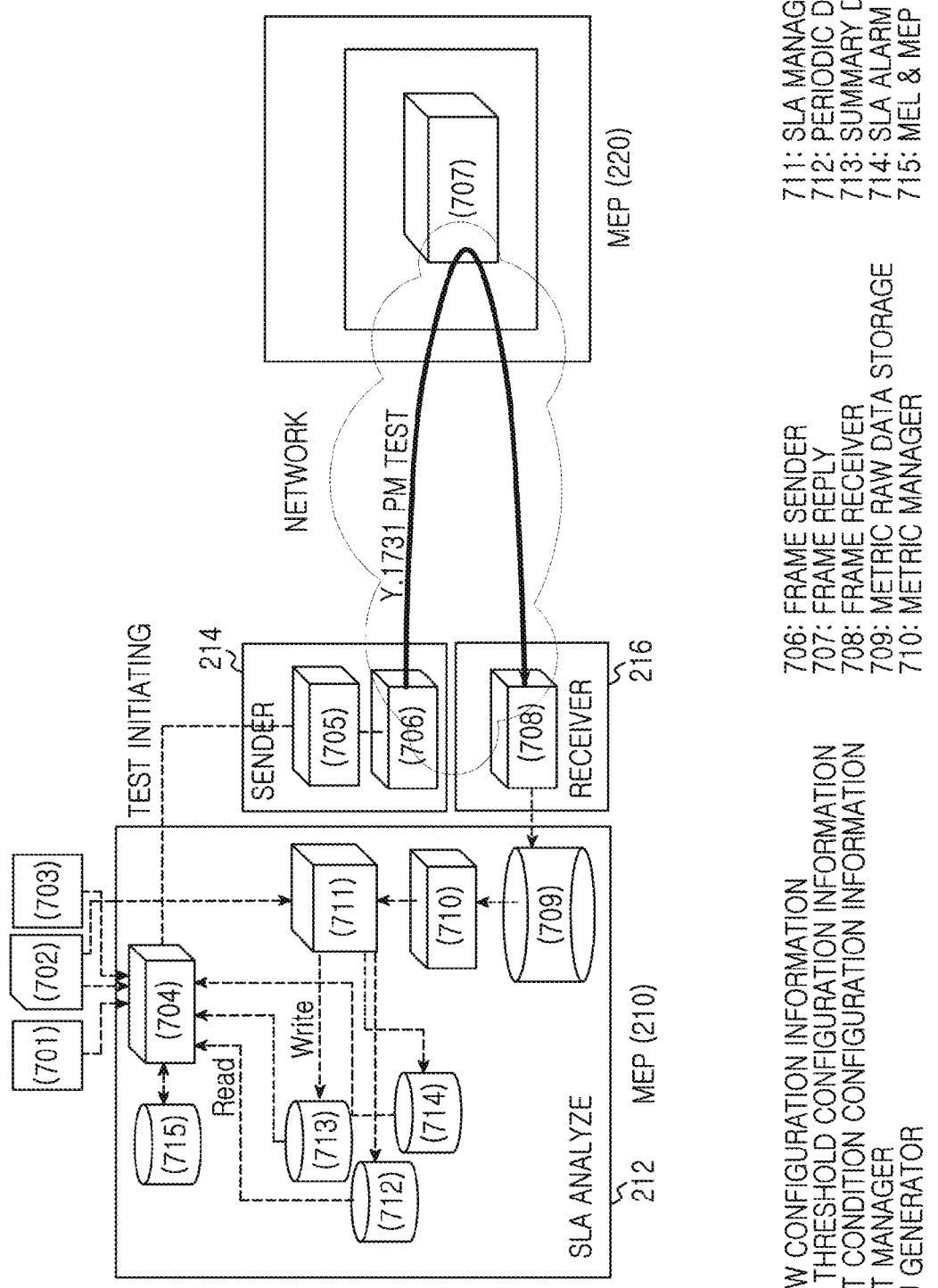
FIG. 7 is a block diagram illustrating configuration of an apparatus for an SLA measurement operation according to an embodiment of the present disclosure.

FIG. 7 is a block diagram illustrating configuration of an apparatus for an SLA measurement operation according to an embodiment of the present disclosure.

Referring to FIG. 7, the apparatus has configuration for the SLA measurement operation for a single session. A transmission-side MEP 210 includes an SLA analyzer 212, a sender 214, and a receiver 216. The SLA analyzer 212 includes a test manager 704, a metric raw data storage 709, a metric manager 710, and an SLA manager 711. The sender 214 includes a PDU generator 705 and an Ethernet frame sender 706. The receiver 216 includes an Ethernet frame receiver 708. A reception-side MEP 220 includes an Ethernet frame reply 707.

The SLA measurement operation illustrated in FIG. 7 is performed through a test frame sending procedure, a test frame reply receiving procedure, and an SLA data analysis procedure as follows.

(1) The Test Frame Sending Procedure

Receiving an SLA test execution command from the EMS 100 (illustrated in FIG. 6), the MEP 210 sends parameter information related with flow configuration information 701 and test condition configuration information 703 to the test manager 704. Herein, the test manager 704 plays a role as an initiator which initiates a Y.1731 SLA test based on the received parameter information. The test manager 704 sends a test related parameter to the PDU generator 705. The PDU generator 705 encodes a PDU part of a Y.1731 test frame based on the received information. The Ethernet frame sender 706 encodes L2 frame information in a corresponding PDU and sends a test frame to the peer MEP 220. The sent test frame is the DMM frame as illustrated in FIG. 5. The Ethernet frame reply 707 of the peer MEP 220 inserts timestamp information (RxTimeStampf and TxTimeStampb illustrated in FIG. 5) into a corresponding frame DMM and returns the corresponding frame DMM as a reply frame to the transmission-side MEP 210 again. Herein, the reply frame is the DMR frame illustrated in FIG. 5.

(2) The Test Frame Reply Receiving Procedure

The Ethernet frame receiver 708 of the transmission-side MEP 210 receives the reply frame and stores raw data included in the reply frame in the metric law data storage 709. Herein, the raw data may be stored as a file type.

The metric manager 710 reads corresponding raw data, analyzes metric information by stages (hierarchically), and sends the analyzed result to the SLA manager 711.

(3) The SLA Data Analysis Procedure

The SLA manager 711 stores periodic data 712 and SLA alarm data 714 based on SLA threshold configuration information 702. Several frames may be sent and received during a time duration according to a test condition. In this case, the SLA manager 711 analyzes a result of the frames and stores a corresponding summarized result as summary data 713. In order to perform a multi-session test later, the test manager 704 stores Maintenance Entity Group (MEG) Level (MEL) and MEP data 715 from flow configuration information and refers to the corresponding data when performing the test.

Figure 8:
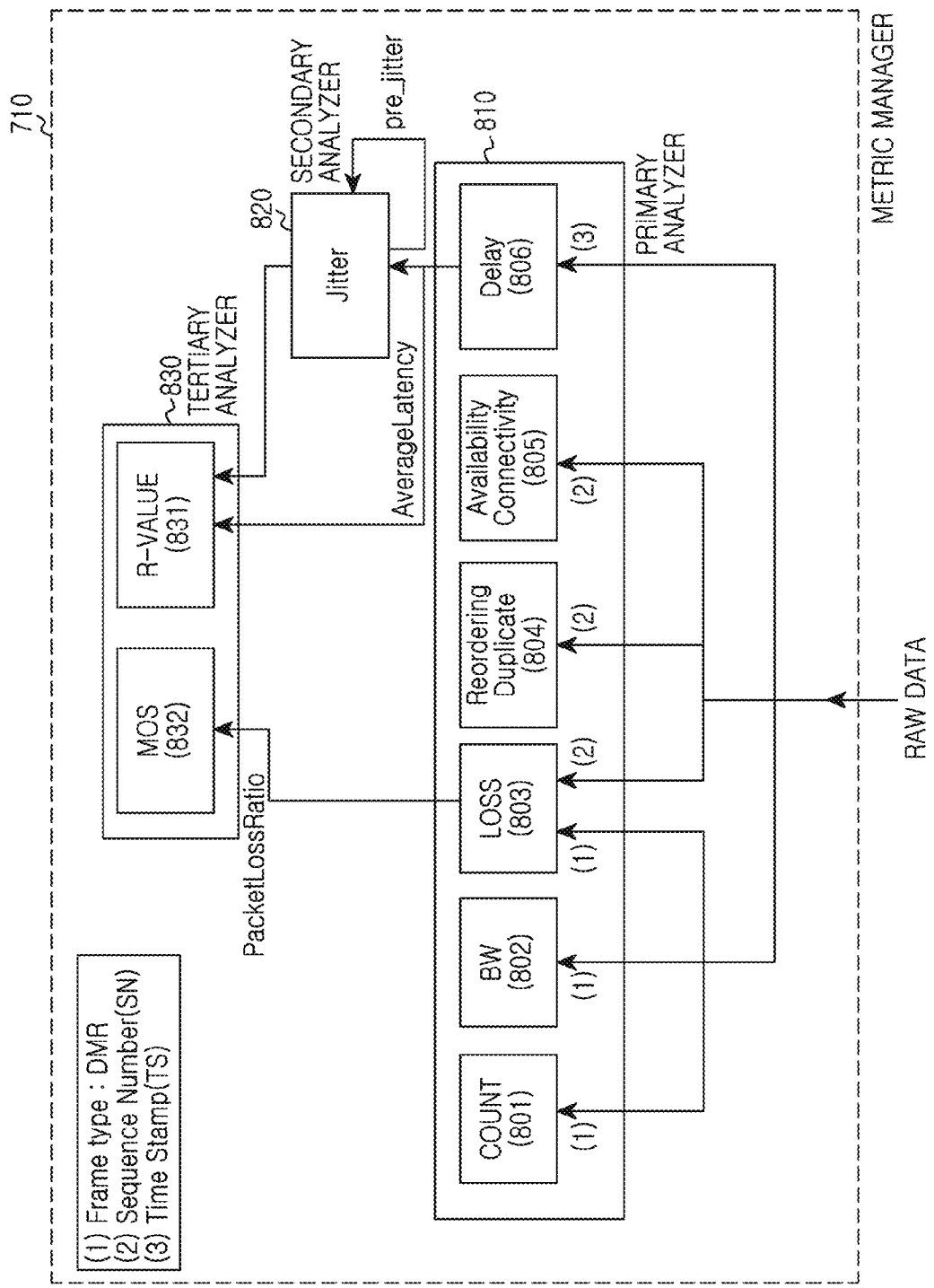
FIG. 8 is a block diagram illustrating detailed configuration of a metric manager according to an embodiment of the present disclosure.

FIG. 8 is a block diagram illustrating detailed configuration of a metric manager according to an embodiment of the present disclosure.

Referring to FIG. 8, a detailed configuration of a metric manager 710 illustrated in FIG. 7 is illustrated. The metric manager 710 analyzes row data information hierarchically (or by stages) through 3 analysis operations as below and acquires metrics. In these analysis operations, timestamp information, sequence number information, and frame type information are used. Referring to the frame structure illustrated in FIG. 5, the timestamp information corresponds to TxTimeStampf, RxTimeStampf, TxTimeStampb, and RxTimeStampb. The sequence number information corresponds to sequence numbers 502 and 505 and the frame type information corresponds to a type (36) and a type (3). Because a detailed operation for analyzing raw data information and acquiring respective metrics are well known in a corresponding field and an embodiment of the present disclosure does not describe a new acquisition method of respective metrics, the detailed description for the method is omitted. Analysis metrics illustrated in FIG. 8 indicates general metrics. More detailed metrics for the analysis metrics may include metrics, illustrated in FIG. 12, which will be described later.

(1) Primary analysis

A primary analyzer 810 of the metric manager 710 primarily analyzes one raw datum through a frame type and acquires information of a count 801, a BandWidth (BW) 802, and a loss 803 related with a packet transmission and reception result. Also, the primary analyzer 810 acquires information of reordering and duplicate 804 and availability and connectivity 805 based on the primarily analyzed result using a sequence number. Also, the primary analyzer 810 acquires information of a delay 806 based on the primarily analyzed result using timestamp information.

(2) Secondary Analysis

A secondary analyzer 820 of the metric manager 710 acquires information of a current jitter based on a value of a previous delay and jitter and current delay information which is primarily analyzed.

(3) Tertiary Analysis

A tertiary analyzer 830 of the metric manager 710 acquires an R-value 831 using an average latency and the secondarily analyzed jitter and finally acquires a Mean Opinion Score (MOS) 832 which is a user perspective parameter based on a packet loss ratio and the R-value 831. Herein, the R-value 831 and the MOS 832 are values indicating quality of speech or voice quality in a communication system.

Figure 9:
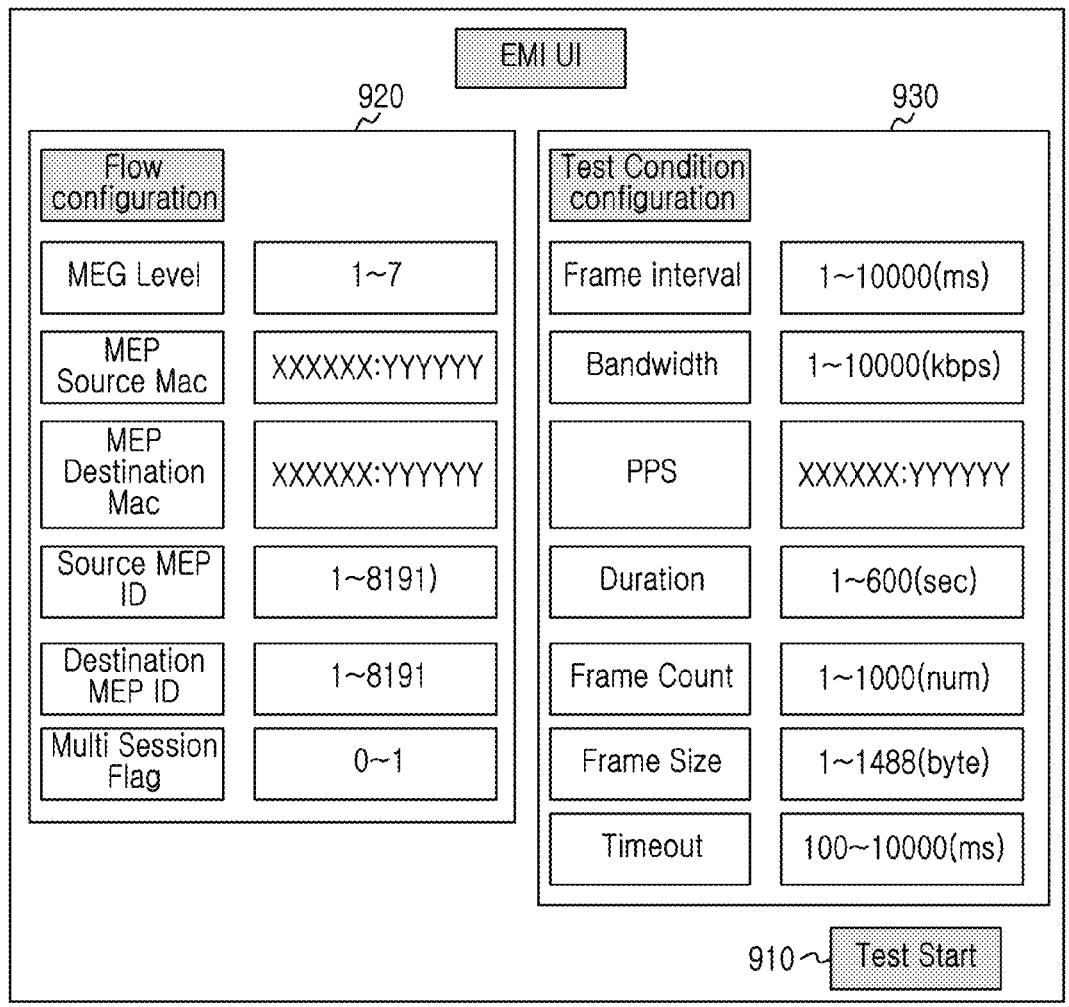
FIG. 9 illustrates a test setting screen for an SLA measurement operation according to an embodiment of the present disclosure.

FIG. 9 illustrates a test setting screen for an SLA measurement operation according to an embodiment of the present disclosure.

Referring to FIG. 9, a test setting screen in the EMS 100 illustrated in FIG. 6 is explained. A flow configuration screen 920, a test condition configuration screen 930, and a button 910 for test start are displayed on a User Interface (UI) screen of the EMS 100. An MEG level, an MEP source Medium Access Control (MAC) address, an MEP destination MAC address, a source MEP ID, a destination MEP ID, and a multi-session flag may be set through the flow configuration screen 920. A frame interval, a bandwidth, a Packet Per Second (PPS), a duration, a frame count, a frame size, and a timeout may be set through the test condition configuration screen 930.

Figure 10:
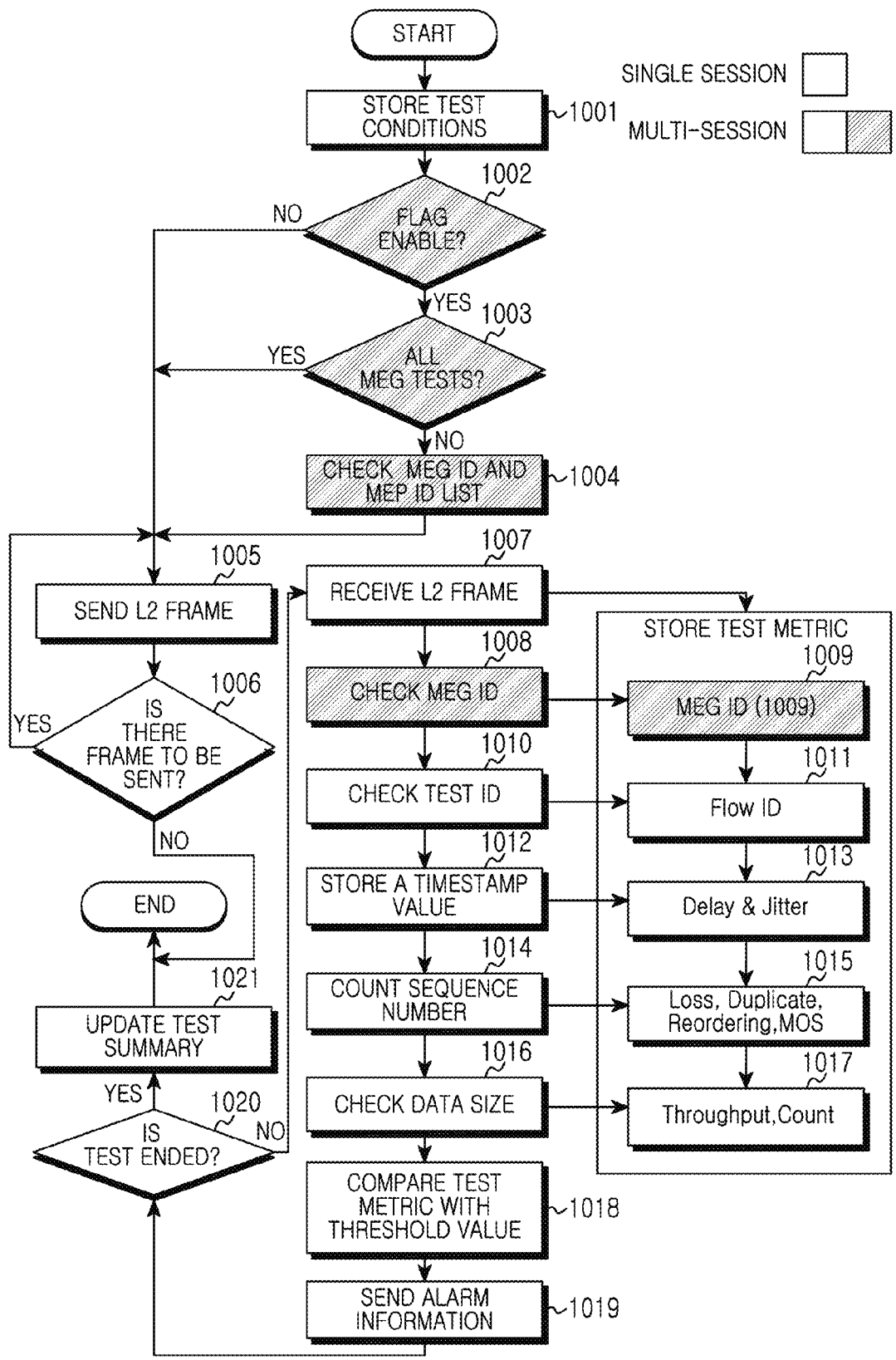
FIG. 10 is a flowchart illustrating an SLA measurement operation according to an embodiment of the present disclosure.

FIG. 10 is a flowchart illustrating an SLA measurement operation according to an embodiment of the present disclosure.

Referring to FIG. 10, the SLA measurement operation is an operation performed in the SLA layer 603 illustrated in FIG. 6. A flowchart illustrating an operation for a single session and an operation for a multi-session is illustrated. Operations 1002, 1003, 1004, 1008, and 1009 are added in an SLA measurement operation for a multi-session and are omitted in an SLA measurement operation for a single session.

(1) Store a Test Condition and Verify a Session Flag

The SLA layer 603 illustrated in FIG. 6 stores a test condition through a test setting command received from the OAM layer 602 in operation 1001. Also, the SLA layer 603 verifies whether a multi-session flag is enabled in operation 1002. When the multi-session flag is enabled, the SLA layer 603 verifies all MEG flags in operation 1003. Otherwise when the multi-session flag is not enabled in operation 1002 proceed to operation 1005. When all MEG tests are not performed in operation 1003, the SLA layer 603 verifies an MEG ID and an MEP ID list in operation 1004. Otherwise, when all MEG tests are performed in operation 1003, proceed to operation 1005.

(2) Send and Receive a Test Frame and Acquire a Metric

After storing the test condition, the SLA layer 603 repeatedly sends an L2 frame to a peer MEP in operation 1005 while verifying whether there is a frame to be transmitted by verifying a SendCount value in operation 1006. Thereafter, the SLA layer 603 receives a reply frame to the sent L2 frame from the peer MEP in operation 1007. Otherwise in operation 1006, when there are no more frames to be sent, end processing.

Receiving the reply frame, the SLA layer 603 analyzes information included in the reply frame, etc. and acquires metric information in operations of 1008, 1010, 1012, 1014, and 1016. The SLA layer 603 updates and stores the acquired metric information as periodic data in operations of 1009, 1011, 1013, 1015, and 1017. For example, the SLA layer 603 analyzes the received frame. That is, the SLA layer 603 determines an MEG ID included in the received reply frame in operation 1008, determines a test ID in operation 1010, stores a timestamp value in operation 1012, counts a sequence number in operation 1014, and determines a data size in operation 1016. Thereafter, the SLA layer 603 acquires the metric information and updates the acquired result as periodic data. For example, the SLA layer 603 acquires an MEG ID in operation 1009, acquires a flow ID in operation 1011, acquires metrics of a delay and a jitter in operation 1013, acquires metrics of loss, duplicate, reordering, and MOS in operation 1015, and acquires metrics of a count and a throughput in operation 1017. As illustrated in FIG. 8, the analysis and acquisition operation of this metrics is performed by stages.

(3) Analyze Metrics and Send the Analyzed Result

The SLA layer 603 sends the acquired metric result to OAM layer 602. Also, the SLA layer 603 compares the acquired metric information with SLA threshold information in operation 1018, generates alarm information according to the compared result, and sends the generated alarm information to the OAM layer 602 in operation 1019. This metric operation is that a frame test for a corresponding session is ended. The metric operation is repeatedly performed until it is verified that the frame test for the corresponding session is ended in operation 1020. When it is determined that the frame test is ended, the SLA layer 603 summarizes data according to the test result in operation 1021. Otherwise, in operation 1020, when it is not determined that the frame test is ended, proceed to operation 1007.

FIG. 11 illustrates a test condition for an SLA measurement operation according to an embodiment of the present disclosure.

Referring to FIG. 11, functions which may be measured according to one embodiment of the present disclosure are illustrated. In more detail, functional blocks such as a packet sampling method, a packet interval control, a test duration, a frame size, a desired bandwidth, a session control, an SLA management, an analysis, etc. may be tested. These test conditions are identical to conditions provided in a conventional IP SLA framework. Also, in accordance with one embodiment of the present disclosure, functional blocks such as a flow configuration functional block and a Quality of Service (SLA) functional block may be added as test conditions. The flow configuration functional block may include functions such as an MEG level configuration 1101, an MEP source MAC address 1102, an MEP destination MAC address 1103, MEP MAC masks 1104, a source MEP ID 1105, and a destination MEP ID 1106. The SLA functional block may include a function of marking 1107.

FIG. 12 illustrates metrics for an SLA measurement operation according to an embodiment of the present disclosure.

Referring to FIG. 12, in accordance with one embodiment of the present disclosure, metrics of categories such as a count, a bandwidth, an error, an SLA, and an alarm may be measured. The category count may include metrics such as Packets (Tx/Rx) (Delta), Bytes (Tx/Rx) (Delta), Packets (Tx/Rx) (Sum), and Bytes (Tx/Rx) (Sum). The category bandwidth may include metrics such as Throughput bps (Tx/Rx) (Delta), Throughput pps (Tx/Rx) (Delta), Throughput bps (Tx/Rx) (Sum), and Throughput pps (Tx/Rx) (Sum).

The category error may include metrics such as Internal Loss (Delta): Timeout drop, Internal Loss (Sum): Timeout drop, Network Loss (Delta), Network Loss (Sum), Uplink Loss, Downlink Loss, Loss bursts, Loss Ratio (Delta), Loss Ratio (Sum), Longest loss burst, Shortest loss burst, Reordering, Reordering Ratio, Duplicate, and Duplicate Ratio. The category SLA may include metrics such as Delay (Two-way) (Delta), Delay (Two-way) (Sum), Delay (One-way) (Sum): Need Time sync, Jitter (Two-way, RTP based) (Delta), Jitter (Two-way, RTP based) (Sum), Jitter (One-way, RTP based) (Sum), Voice Quality (MOS) (Delta), Voice Quality (R-Factor) (Delta), Voice Quality (MOS) (Sum), Voice Quality (R-Factor) (Sum), Availability (Sum), and Connectivity (Sum). The category alarm may include metrics such as LOSS, LOSS RATIO, THROUGHPUT, DELAY, JITTER, MOS, CONNECTIVITY, AND AVAILABILITY FIG. 13 illustrates an analysis result according to SLA measurement according to an embodiment of the present disclosure.

Referring to FIG. 13, the analysis result is obtained when a multi-session test for a plurality of MEPs (MEP2 to MPE 6) and all MEG levels are performed. As a result of the multi-session test, it may be known that metrics of LOSS, DELAY, JITTER, THROUGHPUT, MOS, CONNECTIVITY, AVAILABILITY, and ALARM are measured.

FIG. 14 illustrates execution of an SLA measurement operation for a multi-session according to another embodiment of the present disclosure.

Referring to FIG. 14, a structure for managing a multi-session based on a Y.1731 PM protocol as follows is illustrated.

(1) Unicast Session Management Centered on a Specific MEP

An MEP which is normally located at an end manages a session (peer MEP) by a unicast unit centered on it. For example, unicast session management may be performed centered on an MEP1 which is a base station.

(2) All Session Management in an MEG

An MEP sets various MEG levels therein to manage the MEP's peer MEP and continuously manage a session for each peer MEP which belongs to an MEG level. A session for an MEP1 is managed in an MEG level X (MEG1). A session for MEPs 2 and 5 is managed in an MEG level Y (MEG2). A session for MEPs 3 and 4 is managed in an MEG level Z (MEG3).

(3) Unified Metric and Statistics Collection of a Multiple MA and a Multi-Session from an EMS 1401

The EMS 1401 may collect unified metric and statistics information from the multiple MA and the multi-session using a multi-session management characteristic of this MEP.

(4) Dynamic MEP Registration and Session Management

If a conventional dynamic MEP registration function of a Y1731 protocol is used, a registered session may be dynamically managed.

FIG. 15 is a block diagram illustrating an apparatus for an SLA measurement operation for a multi-session according to another embodiment of the present disclosure.

Referring to FIG. 15, a multi-session manager 1501 interworks with a plurality of single session managers. The multi-session manager 1501 initializes a shared memory 1502 based on MEL and MEP data 715 which exist in each of the single session managers. Also, the multi-session manager 1501 reads periodic data information whenever a test is completed and stores an SLA analysis result in the shared memory 1502. Herein, the SLA analysis result is classified and stored in an area for a peer MEP ID of the shared memory 1502. Therefore, multi-session SLA information is stored in the shared memory 1502.

As described above, in accordance with various embodiments of the present disclosure, an end-to-end SLA may be measured in a network environment which must use an L2 frame.

Detailed effects according to these various embodiments are as follows.

An end-to-end SLA may be measured in an L2 based network in which wired and wireless communication equipment is mixed. Particularly, an SLA of a backhaul interval of a wireless network may be accurately measured. If a problem interval is generated, diagnosis for the problem interval may be performed.

Measurement may be more simply and quickly performed when a test is performed by a protocol whose processing overhead for packets is smaller than that of a test protocol of an L3 or more through a simple PDU structure of an L2 frame.

Functions of a proactive measurement method as well as an on-demand measurement method may be provided using a dynamic MEP registration function which is a basic Y.1731 protocol function.

Desired functions may be easily expanded and implemented by applying a Y.1731 PM protocol. The protocol may be expanded for necessary functions in addition to functions defined in a basic Y.1731 protocol and the functions may be provided.

Various desired test conditions may be set when measuring quality and diagnosing a problem using a Y.1731 PM integrated frame. A flow setting function of an L2 packet generator level is provided. Test conditions such as test duration, a packet size, and an amount of traffics may be set. When traffic is provided by a desired test condition using these functions, an SLA which replies actually in a network may be measured and managed.

A strong SLA management function is provided by integrating Y.1731 PM frames which were previously separated. In accordance with various embodiments of the present disclosure, a result measured through the Y.1731 PM protocol is processed and various primary, secondary, and tertiary SLA parameters for a network SLA are provided.

Particularly, SLA metrics of an R-value, MOS, etc. which may not be measured by a separated frame may be provided.

A network bandwidth which must be provided to obtain metrics may be reduced by integrating Y.1731 PM frames which were previously separated. Inefficiency for measuring an overlapped metric by frames which were previously separated may be reduced by providing an integrated test environment by one frame.

A multi-session management function which may acquire a test result for each MEP registered in a multiple MEG group is supported. A function for simultaneously measuring and managing SLA metrics for several sessions may be supported through the multi-session management function. Furthermore, integrated management for the entire L2 network may be performed through the EMS.

As described above, although the present disclosure is described by limited various embodiments and drawings, it is not limited to the various embodiments. A person of ordinary skill in the pertinent art in a field to which disclosure pertains may perform various correction and modification from this description. For one example, although various embodiments of the present disclosure are described only when specific metrics are acquired through a test, the scope of protection of the present disclosure must not be limited to it. For another example, it is described that operations according to various embodiments of the present disclosure are performed by components of the MEP illustrated in FIG. 7. However, these operations may be implemented by a single processor or some processors. In this case, program instructions for performing the operation implemented by various processors may be recorded in a computer readable medium. The computer readable medium may include program instructions, data files, data structures, etc. separately or include combination of them. The program instructions are specially designed or configured for the present disclosure or may be well known and used to a person of ordinary skill in the art. The computer readable media include magnetic media such as a hard disk, a floppy disk, and a magnetic tape, an optical recording medium such as a floptical disk, and a hardware device, such as a Read Only Memory (ROM), a Random Access Memory (RAM), and a flash memory, which are specially configured to store and perform program instructions. The program instructions include not only machine language codes made by a compiler but also high level language codes which may be executed by a computer using an interpreter, etc. When all or a part of base stations or relays described in the present disclosure is implemented by a computer program, the computer readable medium which stores the computer program is included in the present disclosure.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a device, the method comprising:
generating a measurement frame for measuring a plurality of service level agreement (SLA) metrics;
transmitting, to another device, the measurement frame;
receiving, from the other device, a reply frame corresponding to the measurement frame; and
determining the plurality of SLA metrics for the other device based on the reply frame,
wherein the measurement frame includes a first field for synchronizing with the other device and a second field for indicating a first sequence number regarding the measurement frame, and
wherein the reply frame includes the first field, the second field, and a third field for indicating a second sequence number regarding the reply frame.

2. The method of claim 1, wherein the plurality of SLA metrics include a delay, a jitter, and a loss.

3. The method of claim 1, wherein each of the measurement frame and the reply frame includes a fourth field including information for measuring a delay, and
wherein each of the second field and the third field includes information for measuring at least one of loss, reordering, duplicate, availability, and connectivity.

4. The method of claim 3, wherein each of the measurement frame and the reply frame further includes a fifth field including frame type information for measuring a packet transmission and reception result.

5. The method of claim 4, wherein the acquiring of the plurality of SLA metrics comprises:
performing a primary analysis process of acquiring a delay metric based on the fourth field, acquiring metrics of a count, a bandwidth, and a loss based on the fifth field, and acquiring at least one metric of reordering, duplicate, availability, and connectivity based on the second field and the third field;
performing a secondary analysis process of acquiring a jitter metric using the delay metric; and
performing a tertiary analysis process of acquiring a voice quality metric using the jitter metric.

6. The method of claim 1, further comprising:
transmitting information about the acquired plurality of SLA metrics to an upper management system.

7. The method of claim 6, wherein the information about the acquired plurality of SLA metrics includes diagnosis information as a result of comparing the acquired plurality of SLA metrics with predetermined metric threshold values.

8. The method of claim 1, wherein the generating of the measurement frame for measuring the plurality of SLA metrics comprises generating the measurement frame based on a test condition provided from an upper management system.

9. The method of claim 1, further comprising:
transmitting to a third device except for the other device, another measurement frame;
receiving, from the third device, another reply frame corresponding to the other measurement frame; and
determining the plurality of SLA metrics for the third device based on the other reply frame,
wherein the other measurement frame includes a first field for synchronizing with the third device and a second field for indicating a first sequence number regarding the other measurement frame, and
wherein the other reply frame includes the first field, the second field, and a third field for indicating a second sequence number regarding the other reply frame.

10. A device comprising:
at least one processor configured to generate a measurement frame for measuring a plurality of service level agreement (SLA) metrics;
a transmitter configured to transmit, to another device, the measurement frame; and
a receiver configured to receive, from the other device, a reply frame corresponding to the measurement frame, wherein the at least one processor is further configured to determine the plurality of SLA metrics for the other device based on the reply frame, wherein the measurement frame includes a first field for synchronizing with the other device and a second field for indicating a first sequence number regarding the measurement frame, and wherein the reply frame includes the first field, the second field, and a third field for indicating a second sequence number regarding the reply frame.

11. The device of claim 10, wherein the plurality of SLA metrics include a delay, a jitter, and a loss.

12. The device of claim 10, wherein each of the measurement frame and the reply frame includes a fourth field including information for measuring a delay, and wherein each of the second field and the third field includes information for measuring at least one of loss, reordering, duplicate, availability, and connectivity.

13. The device of claim 12, wherein each of the measurement frame and the reply frame further includes a fifth field including frame type information for measuring a packet transmission and reception result.

14. The device of claim 13, wherein the at least one processor is further configured to perform:

a primary analysis process of acquiring a delay metric based on the fourth field, acquiring metrics of a count, a bandwidth, and a loss based on the fifth field, and acquiring at least one metric of reordering, duplicate, availability, and connectivity based on the second field and the third field, a secondary analysis process of acquiring a jitter metric using the delay metric, and a tertiary analysis process of acquiring a voice quality metric using the jitter metric.

15. The device of claim 10, wherein the at least one processor is further configured to control to transmit information about the acquired plurality of SLA metrics to an upper management system.

16. The device of claim 15, wherein the information about the acquired plurality of SLA metrics includes diagnosis information as a result of comparing the acquired plurality of SLA metrics with predetermined metric threshold values.

17. The device of claim 10, wherein the at least one processor is further configured to generate the measurement frame based on a test condition provided from an upper management system.

18. The device of claim 10, further comprising:

a transmitter configured to transmit, to a third device except for the other device, another measurement frame; and a receiver configured to receive, from the third device, another reply frame corresponding to the other measurement frame, wherein the at least one processor is further configured to determine the plurality of SLA metrics for the third device based on the other reply frame, wherein the other measurement frame includes a first field for synchronizing with the third device and a second field for indicating a first sequence number regarding the other measurement frame, and wherein the other reply frame includes the first field, the second field, and a third field for indicating a second sequence number regarding the other reply frame.

* * * * *